Oct. 6, 1959 L. P. SIEGEL 2,907,217

REMOTE CONTROL FOR TELEVISION RECEIVERS

Filed May 10, 1956 2 Sheets-Sheet 1

INVENTOR.

Lessing P. Siegel

BY Hill, Sherman, Meroni, Gross & Simpson

Oct. 6, 1959 L. P. SIEGEL 2,907,217

REMOTE CONTROL FOR TELEVISION RECEIVERS

Filed May 10, 1956 2 Sheets-Sheet 2

INVENTOR.
Lessing P. Siegel by Hill, Sherman, Meroni, Gross & Simpson

United States Patent Office 2,907,217
Patented Oct. 6, 1959

2,907,217

REMOTE CONTROL FOR TELEVISION RECEIVERS

Lessing P. Siegel, Chicago, Ill.

Application May 10, 1956, Serial No. 583,999
9 Claims. (Cl. 74—10.15)

This invention relates to a system for the remote control of the operation of television receivers, and the primary object of the invention is to provide a simple, compact, easily operated, inexpensive and reliable system which can be applied to any television receiver having a tuner of the type including a channel selector shaft rotatable into any desired one of a plurality of positions corresponding to the various television channels with detent means releasably locking the shaft in such positions.

Another object of the invention is to provide a system which is easy and simple to install and adjust.

A further object is to provide a system which will permit normal manual operation of the receiver.

Still another object is to provide a system in which the volume of sound and also the supply of power are remotely controlled.

In brief, the system of this invention comprises a remote control unit which is connected through a cable to a compact actuator unit which is readily mounted on the television receiver. The control unit has a button depressible to cause energization of a solenoid in the actuator to effect movement of an armature which is coupled to an actuator shaft having its inner end coupled to the outer end of the channel selector shaft of the receiver, to tune from one channel to the next adjacent channel each time the control button is depressed.

The coupling arrangement between the solenoid armature and the actuator shaft forms a highly important feature of the invention. In particular, it is so constructed as to be readily adjustable to obtain absolutely reliable operation with any tuner of the channel selector type employing indexing by means of detent action, notwithstanding the fact that there are great variations in the operational characteristics of such tuners, due to variations in design, variations in manufacture, and variations due to wear, etc. The arrangement is also such as to permit normal tuning operation by means of a knob on the outer end of the actuator shaft. A specific feature is in the provision of an illuminated dial such that the channel tuning is visible from a remote point.

A further feature of the invention is in the provision of a volume control on the control unit with a connection arrangement such that connections to the receiver are readily effected.

Another feature is in the provision of means whereby the power to both the control system and the television receiver can be switched on or off at the control unit.

This invention contemplates other objects, features and advantages which will become more fully apparent from the following detailed description taken in conjunction with the accompanying drawings which illustrate preferred embodiments and in which.

As shown on the drawings.

Figures 1, 2, 3, 4:
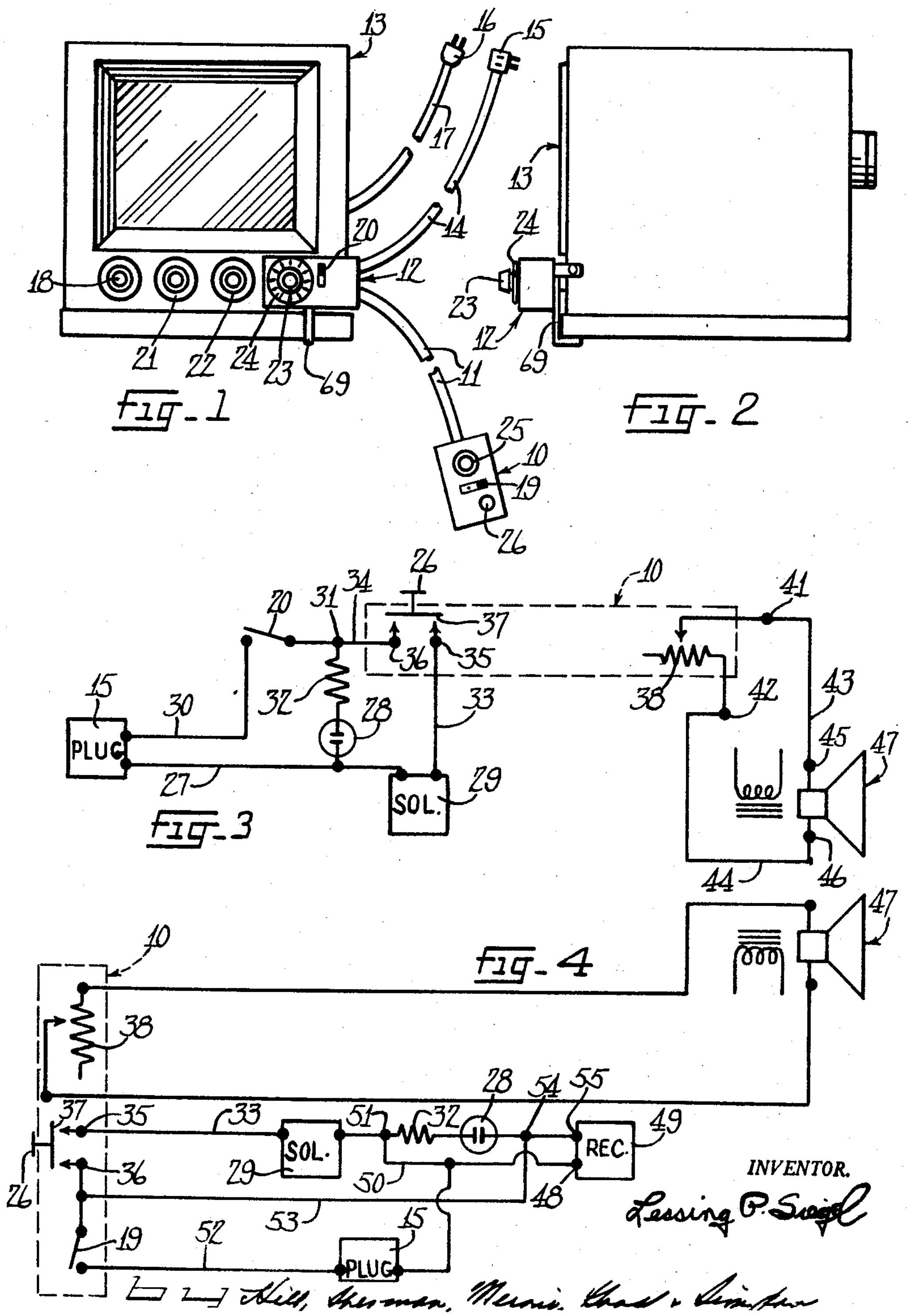
Figure 1 is a front elevational view of a television receiver with the remote control system of this invention installed.
Figure 2 is a side elevational view of the receiver of Figure 1.
Figure 3 is a schematic diagram of one preferred electrical wiring arrangement.
Figure 4 is a schematic diagram of another preferred electrical wiring arrangement.

Reference numeral 10 generally designates a control unit which is connected through a cable 11 to an actuator unit 12 which is mounted on a television receiver 13. The actuator unit 12 is connected through a cable 14 to a plug 15 which may be inserted in a conventional outlet, and the plug 15 may also form a receptacle for a plug 16 connected through a cord or cable 17 to the television receiver to supply electrical power thereto.

In operation, the usual on-off switch of the television receiver 13, controlled by a knob 18, is turned to the "on" position and either a switch 19 on the control unit 10 or a switch 20 on the actuator unit 12 is turned to an "on" position (depending upon the circuit connection as will be described), and after the receiver is warmed up, it may be adjusted by means of control knobs such as a knob 18 and knobs 21 and 22 to obtain proper operation on all usable channels in approximately the desired volume, the channels being selected by rotation of a control knob 23, in a clockwise direction. The knob 23 is mounted on the actuator unit 12 and carries a dial 24 of transparent or translucent material which bears indicia indicating the number of the channel to which tuned, a pilot light being provided in the unit 12 to illuminate a portion of the dial 24 so that the channel selection is visible from a remote location.

The control unit 10 may now be operated at a remote location to control the channel selection and the volume of sound. In particular, a knob 25 is rotatable to control the volume of sound, and a button 26 is depressible to cause rotation of the knob 23 in a clockwise direction, and rotation of the channel selector shaft of the receiver 13 which is coupled to the knob 23, to tune to the next adjacent channel. The tuning is shifted from one channel to the next each time the button 26 is depresesd so that the receiver may be tuned to any desired channel.

Figure 3 is a schematic diagram of one preferred electrical wiring arrangement. In this arrangement, one prong of the plug 15 is connected through a conductor 27 in the cable 14 to one terminal of a pilot light 28 in the actuator unit 12 and also to one terminal of a solenoid coil 29 in the actuator unit 12. The other prong of the plug 15 is connected through a conductor 30 in the cable 14 and through the on-off switch 20 to a circuit point 31 which is connected through a resistor 32 to the pilot light 28. The other terminal of the solenoid 29 and the circuit point 31 are respectively connected through conductors 33 and 34 in the cable 11 to terminals 35 and 36 in the control unit 10, the terminals 35 and 36 being electrically connected together by a contact 37 by depression of the pushbutton 26.

It will be readily apparent that with the switch 20 closed, the pilot light 28 will be energized and the solenoid 29 will be energized upon depression of the button 26, the solenoid 29 being used to cause tuning to a next adjacent channel in a manner as will be described.

The volume control knob 25 is used to control the resistance of a rheostat 38 in the control unit 10 which has terminals 41 and 42 connected through conductors 43 and 44 to the terminals 45 and 46 of the voice coil of a speaker 47 of the television receiver 13. The audio output of the speaker remains connected to the terminals 45 and 46, and it will be appreciated that the connection of conductors 43 and 44 can be readily effected. A portion of the audio output is, of course, applied to the rheostat 38 with the remaining portion being applied to the voice coil of the speaker 47 so that the sound level is controlled by adjustment of the rheostat 38.

In the circuit of Figure 3, the switch 19 of the control unit 10 is not used and need not be provided. In this case, the plug 16 of the television receiver is inserted in a separate outlet or in the alternative, the terminals of the receptacle portion of the plug 15 are connected directly to the prongs thereof so that the plug 16 may be inserted therein. With this arrangement, accordingly, the power imput to the receiver 13 is not controlled from the control unit 10 and is controlled only by the usual on-off switch of the receiver.

Figure 4 is a schematic diagram of another preferred electrical wiring arrangement in which the switch 19 of the control unit 10 is used to control the power imput to the receiver as well as the power imput to the actuator unit 12. In this arrangement, the rheostat 38 is connected to the voice coil of the speaker 47 in identically the same manner as in the circuit of Figure 3. One prong of the plug 15 is connected to one terminal 48 of the receptacle portion of the plug 15, indicated by reference numeral 49, and is also connected through a conductor 50 in the cable 14 to a circuit point 51 which is connected through the solenoid 29 and through the conductor 33 in the cable 11 to the terminal 35 of the pushbutton switch in the control unit 10. The terminal 36 of the pushbutton switch is connected through the switch 19 and through a conductor 52 extending through cables 11 and 14, to the plug 15. The terminal 36 is also connected to a conductor 53 which extends through the cable 11 to a terminal 54 of the unit 12, the terminal 54 being connected to a terminal 55 of the receptacle portion 49 of the plug 15. The pilot light 28 is connected in series with the resistor 32 between the terminals 51 and 54.

With this arrangement and with the plug 16 of the television receiver 13 inserted in the receptacle portion 49 of the plug 15, the supply of power to both the receiver and the control system are controlled by the switch 19 in the remote control unit 10.

The actuator unit 12 comprises a generally rectangular housing including a rear wall 56, a front wall 57, side walls 58 and 59, a bottom wall 60, and a top cover 61. To secure the unit on the television receiver, a pair of generally L-shaped brackets 62 and 63 are secured to the rear wall 56 by bolts 64 and 65, the brackets 62 and 63 having legs on opposite sides of a forwardly projecting portion 66 of the cabinet of the receiver 13 with resilient bumpers 67 and 68 between the legs of the brackets 62 and 63 and the oppositely facing surfaces of the portion 66. The brackets 62 and 63 are preferably provided with slots through which the bolts 64 and 65 extend so as to permit adjustment of the position of the brackets and obtain firm support of the unit. An additional L-shaped bracket 69 may be secured to the rear wall 56 to project under the cabinet of the receiver 13 as illustrated in Figures 1 and 2.

The manner of mounting of the unit 12 will, of course, vary with different receiver constructions, but it will be apparent that since the unit 12 is very compact, it may be readily mounted on virtually all types of receivers by suitably arranging the brackets 62, 63 and 69.

Figure 9:
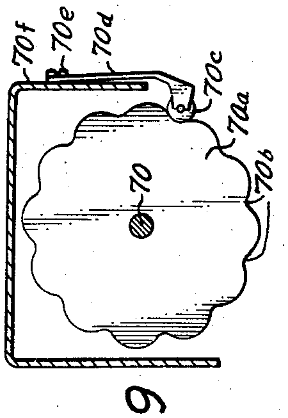
Figure 9 is a sectional view taken just inside the front wall of the television receiver, illustrating the form of conventional detent means used in the tuner.

The receiver 13 has a tuner of the type including a channel selector shaft 70 rotatable into any desired one of a plurality of positions corresponding to the various television channels with detent means releasably locking the shaft 70 in such positions. The detent means may be of a conventional form as illustrated in Figure 9. In particular, the detent means may include a disc 70*a* having notches 70*b* in spaced relation around the periphery thereof, corresponding to the television channels. A roller 70*c* is carried at one end of a spring member 70*d*, the other end of which is secured by a screw 70*e* to the frame 70*f* of the tuner. The roller 70*c* is, of course, pressed firmly in a selected one of the notches 70*b* to maintain the shaft 70 in a selected angular position. An actuator shaft 71 is journalled in the unit 12 to be in alignment with the shaft 70 when the unit is mounted in position. The inner end of the shaft 71 projects through a bushing 72 in the rear wall 56 and is coupled to the shaft 70 through a coupling 73 which may be provided with set screws or preferably spring arrangements for engaging the plant surfaces normally provided on such shafts. The outer end of the shaft 71 projects through the front wall 57 and the knob 23 together with the dial 24 are secured thereto. The pilot light 28 is mounted on the rearward surface of the front wall 57 which is provided with an aperture directly above the axis of the shaft 71 behind the dial 24.

The solenoid coil 29 is mounted in a frame 74 of magnetic material, preferably laminated, which includes a lower leg 75, an upper leg 76, and a vertical leg 77 integrally joining the right-hand ends of the legs 75 and 76. An armature 78 of magnetic material, preferably laminated, has a portion 79 which extends into the coil 29 and downwardly and upwardly projecting arm portions 80 and 81 so as to provide a generally T-shaped configuration. When the coil 29 is energized, the armature 78 is moved to the full line position illustrated, from the dotted line position of Figure 6, so that the right-hand end of the portion 79 is adjacent the center of the leg 77 with the arms 80 and 81 adjacent the left-hand ends of the upper and lower legs 75 and 76 of the frame 74. Shock-absorbing bumpers 82 and 83 are provided on the left-hand ends of the legs 75 and 76.

The armature 78 is coupled through a link 84 to a lug 85 projecting radially outwardly from a sleeve 86 rotatably supported on the shaft 71, so that the sleeve 86 is rotated in a clockwise direction when the solenoid coil is energized to move the armature 78 to the position illustrated in full lines. A one-way clutch assembly generally designated by reference numeral 87 is provided between the sleeve 86 and the shaft 71 to rotate the shaft 71 in a clockwise direction when the sleeve 86 is rotated in a clockwise direction.

Figures 5, 6:
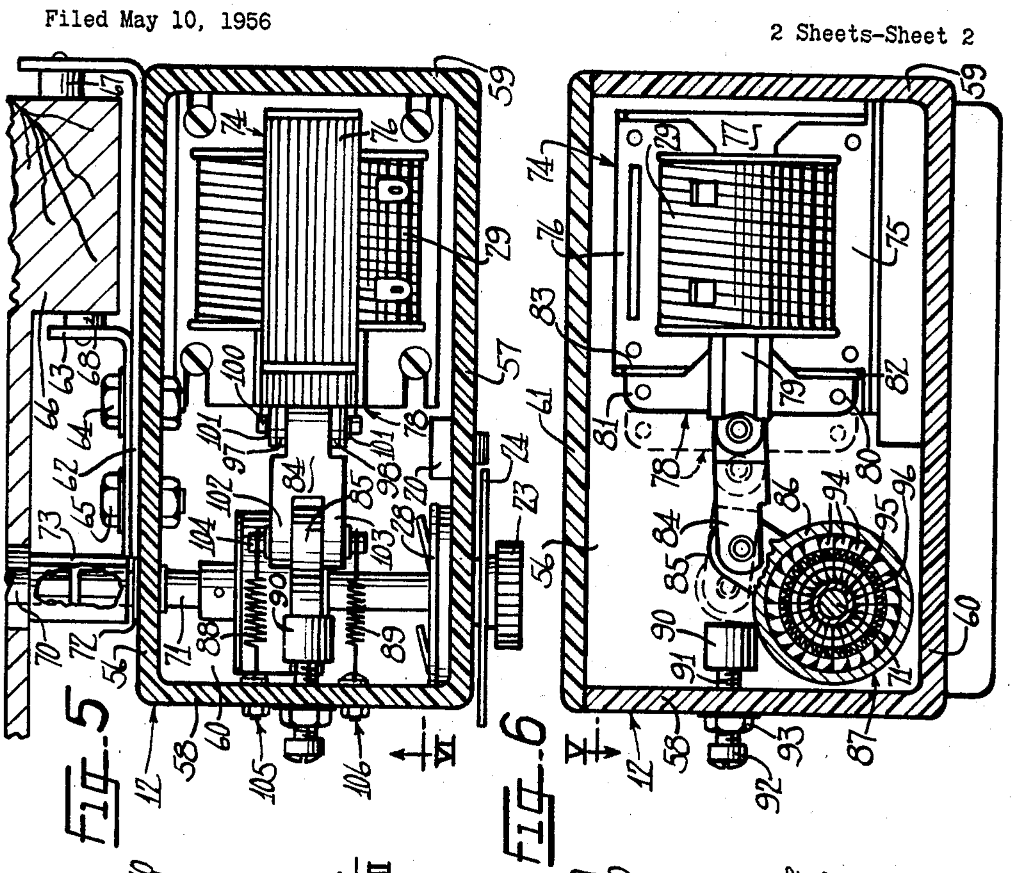
Figure 5 is a horizontal sectional view through the actuator unit of the system, taken just below the top wall of the housing of the unit.
Figure 6 is a sectional view taken substantially along line VI—VI of Figure 5.

When the solenoid coil 29 is de-energized, the lug 85 and armature 78 will be moved to the left to the dotted line positions of Figure 6 to move the sleeve 86 in a counter-clockwise direction, this movement being effected by a pair of springs 88 and 89. A stop member 90, preferably of resilient impact-absorbing material, is disposed in the path of the lug 85 to limit the return movement thereof under the force of the springs 88, 89. The stop member 90 is supported on the end of a screw 91 threaded through the wall 58 with a head portion 92 outside the housing of the unit so that the position of the stop member 90 and the initial position of the sleeve 86 are adjustable. A nut 93 is threaded on the screw 91 to engage the outside of the wall 58 and lock the screw in an adjusted position.

The clutch 87 is of a type referred to as a Sprag clutch and comprises a plurality of radially extending elements 94 engaged between the inner surface of the sleeve 87 and the outer surface of a sleeve 95 fixed on the shaft 71. The edges of the elements 94 which face in a clockwise direction are straight and the other edges are curved to converge to points at the inner ends of the elements. A tension spring 96 extends in a circle through the clutch elements 94 and the elements are so formed as to tend to tilt with the outer ends being displaced in a counterclockwise direction from the inner ends. With this arrangement, the shaft can be rotated freely in a clockwise direction relative to the sleeve 86, but the clutch will firmly engage with a small fixed angular rotation of the sleeve in a clockwise direction relative to the shaft.

This coupling system between the solenoid armature and the shaft could be modified in various ways but certain features are essential to satisfactory operation. In particular, it is essential that the clutch be such that it engages after a substantially fixed amount of armature movement and that the mechanical energy applied in each stroke of the armature be adjustable. It has been found that with such a combination, the mechanism can be readily adjusted to obtain absolutely reliable operation regardless of variations in the operational characteristics of the tuner.

The reasons for these requirements appear to be due to the fact that at the instant when the force applied by the solenoid is discontinued, the tuner shaft and elements connected thereto will have a certain momentum or kinetic energy, depending upon the rotational velocity and inertia of the tuning shaft and elements connected thereto, and such momentum will cause further rotation of the tuning shaft, and the tuning shaft may be rotated beyond the position in which the detent mechanism operates which, of course, would produce very erratic operation. By adjusting the energy applied in each stroke of the armature and by using a clutch which engages in the same way every time, the mechanism can be made to operate to effect movement of the tuning shaft through precisely the required angle, regardless of the force exerted by the detent mechanism of the tuner, the inertia of the tuner and frictional forces.

In theory, a ratchet type arrangement could be used with a ratchet wheel having teeth corresponding in number and spacing to the television channels. However, from experiments with this type of mechanism, it was found impossible to obtain reliable operation. If the force exerted by the solenoid is accurately matched to the particular requirements of the tuner to which the ratchet type mechanism is connected, satisfactory operation could conceivably be achieved. However, the accurate match that would be required is practically impossible to achieve in practice.

In addition, tuners vary in regard to the number of channels as well as in the detent spring force, inertia, friction, etc. The detent mechanisms of some tuners operate on channel 1 while in other tuners, it does not. Thus, a ratchet mechanism could not be designed to operate on all types of tuners since a special ratchet wheel would be required for each type of tuner in addition to requiring many different solenoids of many different perfectly matched energy characteristics too numerous to be practical or feasible in any sense.

A further advantage of the coupling system of this invention is that the force exerted by the solenoid does not have to be accurately matched to the force requirements of the particular tuner with which the system is used, and the solenoid can exert a force much greater than that required for any type of tuner, so that the system will operate reliably with all types of tuners. For example, the design torque of tuners now available commercially ranges from about 80 to 120 inch-ounces. The solenoid of the illustrated embodiment is such that the armature 78 will exert a force of 10 to 18 pounds (depending upon its position relative to the frame 74), and the force acts on a radius of about 1 inch so that the output torque is from 160 to 288 inch-ounces. Thus, more than sufficient torque is developed, but by adjusting the position of the stop member 90 to adjust the distance through which the armature moves, the mechanical energy supplied during each stroke of the armature can be adjusted to obtain precisely the right angular movement of the tuning shaft provided, of course, that a clutch such as the clutch 87 is used which engages in the same way every time.

It should be noted that the linkage between the solenoid armature 78 and the sleeve 86 is such as to minimize any binding action or looseness at the pivot joints 100 and 104. In particular, the right-hand end of the link 84 extends between a pair of lugs 97 and 98 on the armature 78 with a pin 100 extending through the lug 97 through the link 84 and through the lug 98, conventional C-washers 101 being provided to lock the pin 100 in position. The left-hand end of the link 84 is bifurcated to provide arms 102 and 103 between which the lug 85 extends, with a pin 104 extending through the arm 102 through the lug 85 and through the arm 103, the pin 104 being also locked in position by C-washers. The left-hand ends of the tension springs 88 and 89 are secured to the side wall 58 by bolts 105 and 106, and the right-hand ends thereof are respectively secured to the opposite ends of the pin 104. The springs 88 and 89 are identical and they exert equal forces on the ends of the pin 104 at points spaced equal distances from the lug 85, and the link 84 has a symmetrical form so that the lugs 97 and 98 are located equal distances from the planes of the opposite sides of the lug 85. With this arrangement, there will be no tendency for tilting of the link 84, and no binding action. This is an advantage from the standpoint of efficiency, but is more important in insuring uniform and reliable operation with the actuator unit 12 installed in any position on the television receiver 13.

Figure 7:
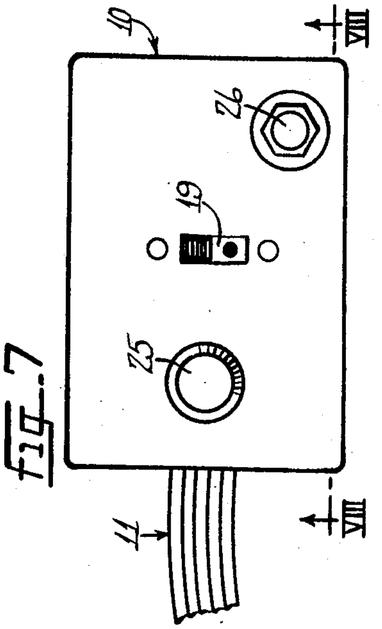
Figure 7 is a top plan view of the control unit of the system.
Figure 8:
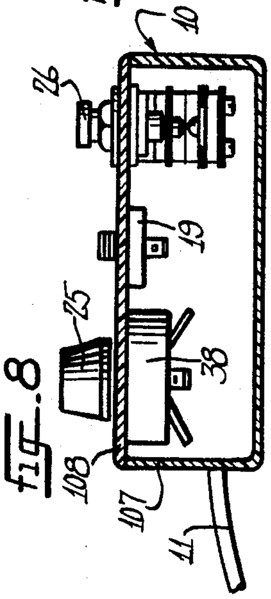
Figure 8 is a sectional view taken substantially along line VIII—VIII of Figure 7.

Referring to Figures 7 and 8, the control unit 10 may comprise a generally rectangular housing 107 having a cover 108 on which the rheostat 38 and switches 19 and 26 are mounted. The switch 19 may either be a toggle type switch as illustrated or it may be mounted on the back of the rheostat 38 to be operated in the initial part of rotation of the control knob 25.

It will be understood that variations and modifications may be effected without departing from the spirit and scope of the novel concepts of this invention.

I claim as my invention:

1. In a remote control system for a television tuner or the like having a tuning shaft selectively rotatable into a plurality of positions with detent means for locking shaft in such positions, a housing, an actuator shaft journalled in said housing, means for mounting said housing with said actuator shaft in axial alignment with the tuning shaft, means for coupling said actuator shaft to the tuning shaft, a reciprocable armature in said housing, spring means in said housing urging said armature in one direction, electro-mechanical means for driving said armature in the reverse direction, and one-way clutch means in said housing connecting said armature and said actuator shaft.

2. In a remote control system for a television tuner or the like having a tuning shaft selectively rotatable into a plurality of positions with detent means for locking the shaft in such positions, a housing having front and rear walls, an actuator shaft journalled in said housing and having outer and inner end portions projecting forwardly and rearwardly from said walls, means for mounting said housing with said actuator shaft in axial alignment with the tuner shaft, means for coupling said inner end portion of said actuator shaft to the tuner shaft, a control knob mounted on said outer end portion of said actuator shaft, a reciprocable armature in said housing, spring means urging said armature in one direction, electro-mechanical means for driving said armature in the reverse direction, and one-way clutch means in said housing connecting said armature and said actuator shaft.

3. In a remote control system for a television receiver or the like including a tuning shaft, a housing having front and rear walls, an actuator shaft journalled in said housing and having outer and inner end portions projecting forwardly and rearwardly from said walls, means for mounting said housing on the television receiver with said actuator shaft in axial alignment with the tuning shaft, means for coupling the inner end portion of said actuator shaft to the tuning shaft, means in said housing for rotating said actuator shaft together with the tuning shaft, a dial mounted on said outer end portion of said actuator shaft, and a light in said housing for illuminating said dial.

4. In a remote control system for a television tuner or the like having a tuning shaft selectively rotatable into a plurality of positions with detent means for locking the shaft in such positions, a reciprocable armature, means urging said armature in one direction, electromechanical means energizable to actuate said armature in the reverse direction, one-way clutch means connected to said armature and arranged to be connected to the tuning shaft, said clutch means being arranged to engage to rotate the tuning shaft after a certain substantially fixed movement of said armature, and means for adjusting the amount of movement of said armature.

5. In a remote control system for a television tuner or the like having a tuning shaft selectively rotatable into a plurality of positions with detent means for locking the shaft in such positions, a reciprocable armature, means urging said armature in one direction, electromechanical means for actuating said armature in the reverse direction, and a one-way Sprag clutch connected to said armature and arranged to be connected to the tuning shaft.

6. In a remote control system for a television tuner or the like having a tuning shaft selectively rotatable into a plurality of positions with detent means for locking the shaft in such positions, a reciprocable armature, means urging said armature in one direction, electromechanical means for actuating said armature in the reverse direction, a one-way Sprag clutch connected to said armature and arranged to be connected to the tuning shaft, and means for adjusting the amount of mechanical energy transmitted from the armature through said clutch to the tuning shaft in each movement of said armature.

7. In a remote control system for a television tuner or the like having a tuning shaft selectively rotatable into a plurality of positions with detent means for locking the shaft in such positions, an actuator shaft arranged to be coupled to the tuning shaft, a sleeve rotatably mounted on said actuator shaft, one-way clutch means between said sleeve and said actuator shaft, a lug projecting radially from said sleeve, a link having a bifurcated end portion receiving said lug, a pin pivotally connecting said bifurcated end portion and lug, a pair of springs connected to the opposite ends of said pin for urging rotation of said sleeve in one direction, an armature having a pair of lugs receiving the outer end of said link, a second pin pivotally connecting said pair of lugs and said other end of said link, and means for actuating said armature.

8. In a remote control system for a television tuner or the like having a tuning shaft selectively rotatable into a plurality of positions with detent means for locking the shaft in such positions, an actuator shaft arranged to be coupled to the tuning shaft, a sleeve rotatably mounted on said actuator shaft, a lug projecting radially from said sleeve, a reciprocable armature, a link connecting said armature and said lug, means for actuating said armature, one-way clutch means between said sleeve and said shaft, and means for adjusting the transmission of energy from said armature to said shaft including a stop member adjustably positioned in the path of said lug.

9. In a remote control system for a television tuner having a tuning shaft selectively rotatable into a plurality of positions with detent means for locking the shaft in such positions, a reciprocable armature, a one-way clutch connected to said armature and arranged to be connected to said tuning shaft, spring means urging said armature in one direction, stop means for limiting movement of said armature in said one direction, an electromagnet device associated with said armature and operative when energized to attract said armature thereto in a direction opposite said one direction, and means for adjustably increasing or decreasing the spacing between said stop means and said electromagnet device to thereby decrease or increase the initial force exerted by said electromagnet device on said armature and thereby adjust for variations in the force exerted by the detent means, said clutch being arranged to allow substantially free rotation in one direction relative to the shaft and to firmly and immediately engage with relative rotation in the other direction to engage in the same way with each and every actuation of said armature regardless of the angular position of said tuning shaft.

References Cited in the file of this patent

UNITED STATES PATENTS

| | | |
|---|---|---|
| 2,304,514 | Sulton | Dec. 8, 1942 |
| 2,307,329 | McDonald | Jan. 5, 1943 |
| 2,321,699 | O'Brien | June 15, 1943 |
| 2,411,754 | Pifer et al. | Nov. 26, 1946 |
| 2,445,031 | McDonald | July 13 ,1948 |
| 2,495,916 | Austin | Jan. 31, 1950 |
| 2,512,714 | Carlzen | June 27, 1950 |
| 2,563,664 | Teaf et al. | Aug. 7, 1951 |
| 2,574,097 | Foster | Nov. 6, 1951 |
| 2,683,841 | Rogers | July 13, 1954 |
| 2,689,281 | Hooker | Sept. 14, 1954 |
| 2,743,797 | Whitaker | May 1, 1956 |
| 2,769,344 | Block et al. | Nov. 6, 1956 |